(12) United States Patent
Goodson

(10) Patent No.: US 7,615,276 B1
(45) Date of Patent: Nov. 10, 2009

(54) ARCHITECTURAL RESIN PANEL WITH THREE-DIMENSIONAL PATTERNS

(75) Inventor: R. Talley Goodson, Salt Lake City, UT (US)

(73) Assignee: 3Form, Inc., Salt Lake City, UT (US)

( * ) Notice: Subject to any disclaimer, the term of this patent is extended or adjusted under 35 U.S.C. 154(b) by 503 days.

(21) Appl. No.: 11/202,784

(22) Filed: Aug. 12, 2005

Related U.S. Application Data

(60) Provisional application No. 60/600,890, filed on Aug. 12, 2004.

(51) Int. Cl.
*B44C 1/17* (2006.01)
*B32B 7/14* (2006.01)
*B29C 47/00* (2006.01)

(52) U.S. Cl. ............. 428/195.1; 428/542.2; 428/542.6; 428/156; 428/203; 428/212; 264/522; 156/244.11; 156/244.16; 156/244.21

(58) Field of Classification Search ............. 428/542.2, 428/332, 339, 13, 130, 211.1, 212, 913.3, 428/322.2, 66.5
See application file for complete search history.

(56) References Cited

U.S. PATENT DOCUMENTS

| | | | |
|---|---|---|---|
| 3,962,009 A * | 6/1976 | Minami et al. ................ 156/85 |
| 5,761,839 A * | 6/1998 | Heikkila ....................... 40/730 |
| 5,866,233 A * | 2/1999 | Oshima et al. .............. 428/172 |
| 5,904,886 A | 5/1999 | Stecker |
| 5,959,719 A * | 9/1999 | Williams ...................... 355/32 |
| 6,025,069 A * | 2/2000 | Eckart et al. ................ 428/339 |
| 6,150,009 A | 11/2000 | Stecker |
| 6,329,040 B1 * | 12/2001 | Oshima et al. .............. 428/156 |
| 2003/0072934 A1 | 4/2003 | Koolhaas |
| 2003/0098121 A1 | 5/2003 | Moya |
| 2003/0113485 A1 * | 6/2003 | Schober ....................... 428/13 |

FOREIGN PATENT DOCUMENTS

EP 0988967 A1 * 3/2000

* cited by examiner

*Primary Examiner*—Callie E Shosho
*Assistant Examiner*—Prashant J Khatri
(74) *Attorney, Agent, or Firm*—Workman Nydegger

(57) ABSTRACT

A decorative architectural panel can be formed using multiple image layers to create one or more three-dimensional effects in a final product. In particular, a reference image layer comprises an extruded sheet having an artistically-designed reference image formed thereon. A next image layer comprises an extruded sheet having a differently sized iteration of the artistically designed reference image. A manufacturer can place the next image layer over the reference image layer, and set the combined image layers such that the final product shows the artistically-designed image in three-dimensions. Additional image layers, such as a color layer, or a layer having embedded objects, can be combined with the stratified product for additional artistic effects.

32 Claims, 6 Drawing Sheets

|     | PSI     | START      | STOP       |
| --- | ------- | ---------- | ---------- |
| 210 — 1) | 90 - 96 | 70°        | 230° - 240° |
| 220 — 2) | 90 - 96 | 230° - 240° | 120° - 70°  |
| 230 — 3) | STP     |            |            |

|  | PSI | START | STOP |
|---|---|---|---|
| 310 — 1) | 15 - 40 | 70° | 230° - 240° |
| 320 — 2) | 90 - 96 | 230° - 240° | 120° - 70° |
| 330 — 3) | STP | | |

ARCHITECTURAL RESIN PANEL WITH THREE-DIMENSIONAL PATTERNS

CROSS-REFERENCE TO RELATED APPLICATIONS

The present invention claims the benefit of priority to U.S. Provisional Patent Application Ser. No. 60/600,890, entitled ARCHITECTURAL RESIN PANEL WITH THREE-DIMENSIONAL PATTERNS, filed Aug. 12, 2004, the entire contents of which are incorporated herein by reference.

BACKGROUND OF THE INVENTION

1. The Field of the Invention

The present invention relates generally to decorative resin products and processes, for use in architectural design.

2. Background and Relevant Art

Recent architectural designs have focused on decorative panels, such as glass or synthetic resin products, which can be used as decorative windows, and as partitions in offices and homes. In particular, decorative synthetic resin panels are now particularly popular compared with decorative glass panels since decorative resin panels can be manufactured to be more resilient, and to have the same appearance as glass, but with less cost. Furthermore, decorative resin panels (also sometimes referred to as "laminate panels", "laminate materials", or "laminates") have a fairly wide utility since they can be formed to include a wide variety of artistic colors and images.

Present resin materials generally used for creating decorative resin panels comprise polyvinyl chloride, acrylic, poly (methylmethacrylate) or "PMMA", poly(ethylene-co-cyclohexane 1,4-dimethanol terephthalate) or "PETG", as well as related polycarbonates. While each of the aforementioned resin materials can serve as an appropriate glass substitute, each resin material varies in physical properties from one material to the next. For example, polycarbonates, PETG, and PMMA are generally received for use in solid sheet form (i.e., extruded). An extruded sheet is generally a solid preformed sheet, such as a solid 4'×8' PETG sheet (alternatively, 3'×5' sheet, 6'×10' sheet, etc.), which ultimately can form a surface of a decorative resin panel when the panel is in final form. Since extruded PETG sheets provide better structural rigidity at less cost than other similar resin materials, PETG sheets are particularly popular.

One advantage of extruded resin materials, such as extruded PETG, is that multiple extruded sheets can be combined in one or more ways to create a decorative panel having one or more textures or colors. For example, a decorative panel can be created by forming two or more extruded PETG sheets about a two-dimensional colored material, such as a colored or textured vinyl sheet, fabric, or artistically-designed paper. When the decorative panel is properly formed, the image layer takes on the visual properties of the embedded two-dimensional material. Decorative panels using two-dimensional materials can be made fairly easily using conventional manufacturing processes.

A decorative panel can also be created by forming two or more extruded sheets about one or more three-dimensional embedded materials, such as thatch reed, bamboo, crushed rocks, and the like. When the decorative panel is properly formed, one or more of the three-dimensional objects can be seen through the clear (or translucent) resin materials, such that the materials appear to maintain a three-dimensional natural form while suspended in air. Such panels, having three-dimensional materials embedded inside, are typically much more complicated to make.

There may still be other ways of implementing three-dimensional artistic effects in decorative resin panels, albeit without embedding three-dimensional materials. For example, a decorative panel with three-dimensional effects might be manufactured by removing material to form one or more cavities inside the resin material. Alternatively, visually appealing three-dimensional effects might be made in a decorative resin panel by overlapping artistically-designed two-dimensional shapes. Unfortunately, simply removing material does not necessarily require artistic effort, does not lend itself to specific coloration or pattern techniques, and can ultimately have a negative effect on the strength of the decorative resin panel.

By contrast, overlapping successive two-dimensional images would be difficult in terms of cost and quality using present manufacturing techniques. For example, the typical artist's labor for creating a single cutout pattern in one image layer would be relatively high. Of course, the cost of combining several cutout patterns in several image layers would be still higher, and would make the decorative panel difficult to justify on a mass-production scale.

Cost concerns such as these would still be only some of the problems inherent in manufacturing multiple image layers together into a decorative resin product. For example, air bubbles, which are known to form between two or more extruded sheets in a single image layer, can present significant problems in a mass-production process. If the air bubbles are not removed, the air bubbles can be seen through the clear resin product. In other cases, the air bubbles can create reservoirs (also sometimes referred to as "lakes") on the surface of the decorative resin panel, where the reservoirs appear as imperfections to an observer. Unfortunately, placing multiple image layers together compounds the air bubble problem, such that removing air bubbles from multiple image layers would become more complex.

Despite these concerns, there is nevertheless a need in the art for new and appealing types of artistic, decorative resin products. In particular, an advantage in the art can be realized with artistic, decorative resin panels that can provide a three-dimensional effect, and can be efficiently made at a relatively low cost.

BRIEF SUMMARY OF THE INVENTION

The present invention solves one or more of the foregoing problems in the prior art with artistic, decorative resin panels having three-dimensional effects, and with processes for making the same. In particular, an artistically-designed decorative panel can be assembled from a plurality of extruded sheets in such a way as to efficiently create one or more three-dimensional artistic effects, without significantly trapping air.

In at least one implementation, for example, a decorative resin panel for use in architectural design comprises a first, or reference, layer having an artistically-designed reference pattern screened thereon. The reference pattern comprises a plurality of reference portions, such as translucent or transparent reference portions. A second, or next, layer also comprises a second pattern having a plurality of second portions, such that the second pattern is at least partially an iteration of the artistically-designed reference pattern.

A manufacturer then aligns the reference layer and the second layer such that the reference portions of the reference pattern and the second portions of the second pattern align, or register. After subjecting the reference and next layers to appropriate temperatures and pressures, a manufacturer can create a final decorative resin product that appears stratified, or three-dimensional, particularly when viewed through the aligned, or registered portions. Since each layer comprises a screened image rather than a cutout layer between two extruded sheets, costs can be significantly minimized.

Additional features and advantages of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to artistic, decorative resin panels having three-dimensional effects, and with processes for making the same. In particular, an artistically-designed decorative panel can be assembled from a plurality of extruded sheets in such a way as to efficiently create one or more three-dimensional artistic effects, without significantly trapping air.

Figure 1:
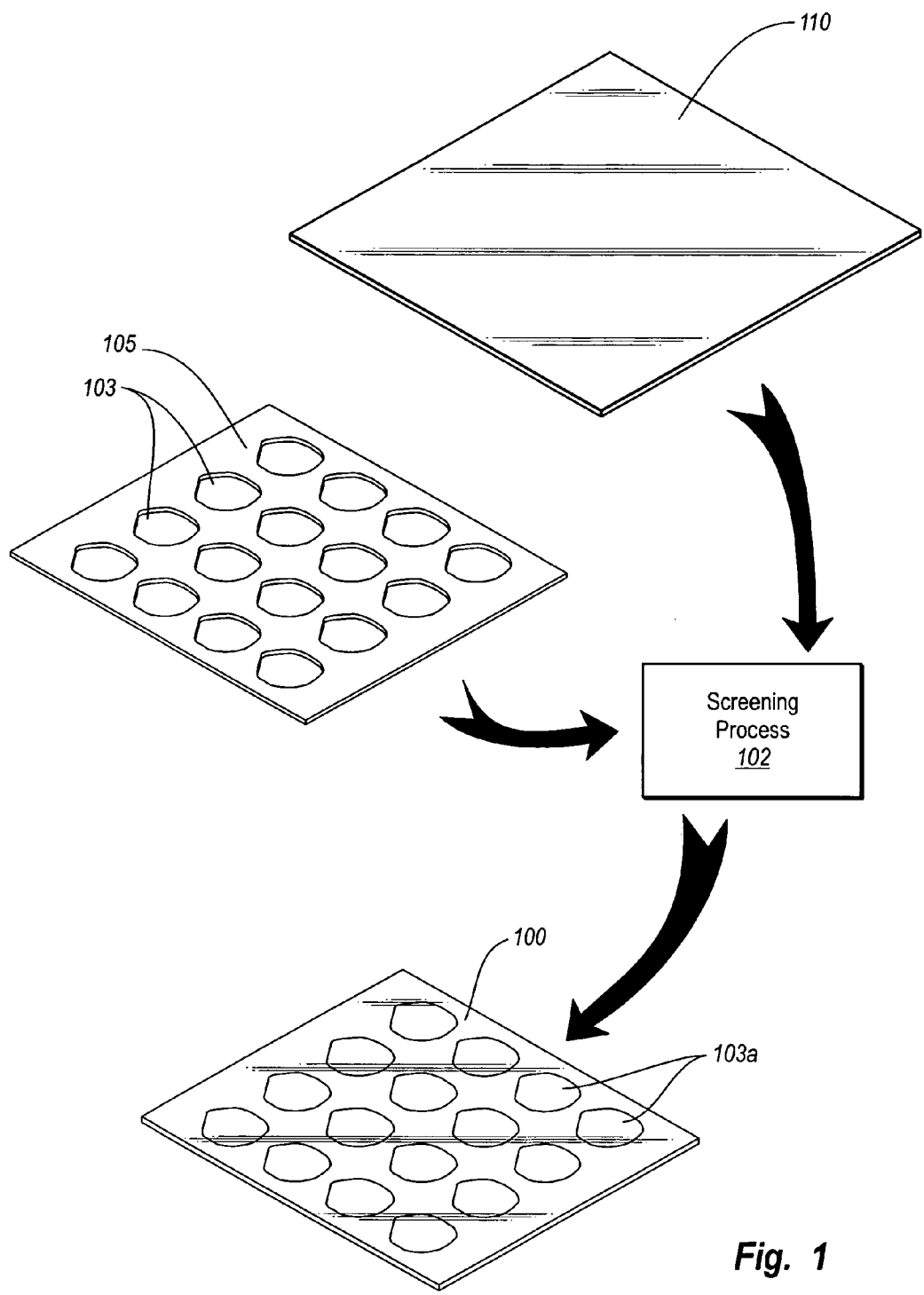
FIG. 1 illustrates a conceptual diagram for preparing an exemplary image layer that can be used in accordance with an implementation of the present invention.

In particular, FIG. 1 illustrates a conceptual diagram for preparing an exemplary first layer 100 that can be used in accordance with an implementation of the present invention. For the purposes of this specification and claims, an "image layer" 100 will be understood to refer generally to one or more layers of a finished, decorative resin panel. More specifically, an image layer will be understood herein as a extruded resin sheet such as an extruded PETG, or polycarbonate sheet that portrays a visual representation. Thus, for example, an image layer comprises two or more extruded resin sheets that have been formed in a thermosetting process about a colored and/or textural two-dimensional or three-dimensional material. Alternatively, a first layer 100 can comprise a single extruded resin sheet 110 on which has been screened a decorative design 105.

As shown in FIG. 1, an artist can design an artistic, decorative design 105, such as an artistic paper in which the artist has cut one or more artistically-designed shapes 103. The artistic design 105 can then be combined with a extruded resin sheet 110 in a screening process 102, such as a silk or digital ink screening process. The result of the screening process 102 is a first layer 100, which can be used to create a decorative resin panel, as described herein, having three-dimensional effects.

By way of general explanation, screening (e.g., silk screening) is a well known process for reproducing an artistic design (e.g., artistic design 105) onto another object. There are a number of types of screening processes, including silk screening and digital screening, each of which can be used competently within the context of the present invention. For simplicity, however, the present description will be described in terms of general "silk screening" processes, as applied to the materials and processes depicted in FIG. 1.

The process of screening 102 an extruded resin sheet typically involves reproducing an artistic image 105 on the extruded resin sheet 100 using one or more photopositive "screen plates" (or screen "colors"). A "screen plate" is an object that represents one or more shapes (or a shape of a certain colored portion) of the artistic image 105. To make a stencil, the manufacturer places a photosensitive emulsion on a silk screen (typically, a porous polyester material), and lays one of the screen plates over the emulsion.

The manufacturer then shines high-intensity light toward the silk screen, causing portions of the emulsion that are not-associated with the screen plate to solidify. The manufacturer then rinses away the non-solidified emulsion portions, leaving solidified emulsion portions in an outline of the artistic object. With respect to FIG. 1, for example, a stencil corresponding to design 105 would comprise a silk screen in which emulsions corresponding to cutouts 103 did not solidify. That is, the stencil would represent a negative image of the artistic design 105, particularly in terms of which emulsions solidified, and which emulsions did not.

The manufacturer then places the stencil on the material-of-interest (e.g., extruded resin sheet 110), and washes an appropriate ink over the stencil, taking care to wipe off the excess ink. (In at least one implementation, an appropriate ink for use with extruded resin sheets is a polyester ink, such as a 9600 series polyester ink made by NAZDAR®.) The ink bleeds through only the porous portions of the silk screen, or the silk screen portions where the emulsion has not solidified.

Thus, when the stencil is pulled away from the material-of-interest, the ink remains on the material, such that the ink forms a shape of the desired artistic image (e.g., first layer 100). As shown in FIG. 1, for example, the first layer 100 comprises a series of non-ink (e.g., transparent) shapes 103a surrounded by ink portions (e.g., opaque) left from the screening process. With other artistic designs, multiple colors and shapes in the design may require repetition of the foregoing steps several times using several different stencils and/or types of inks.

Figure 2:
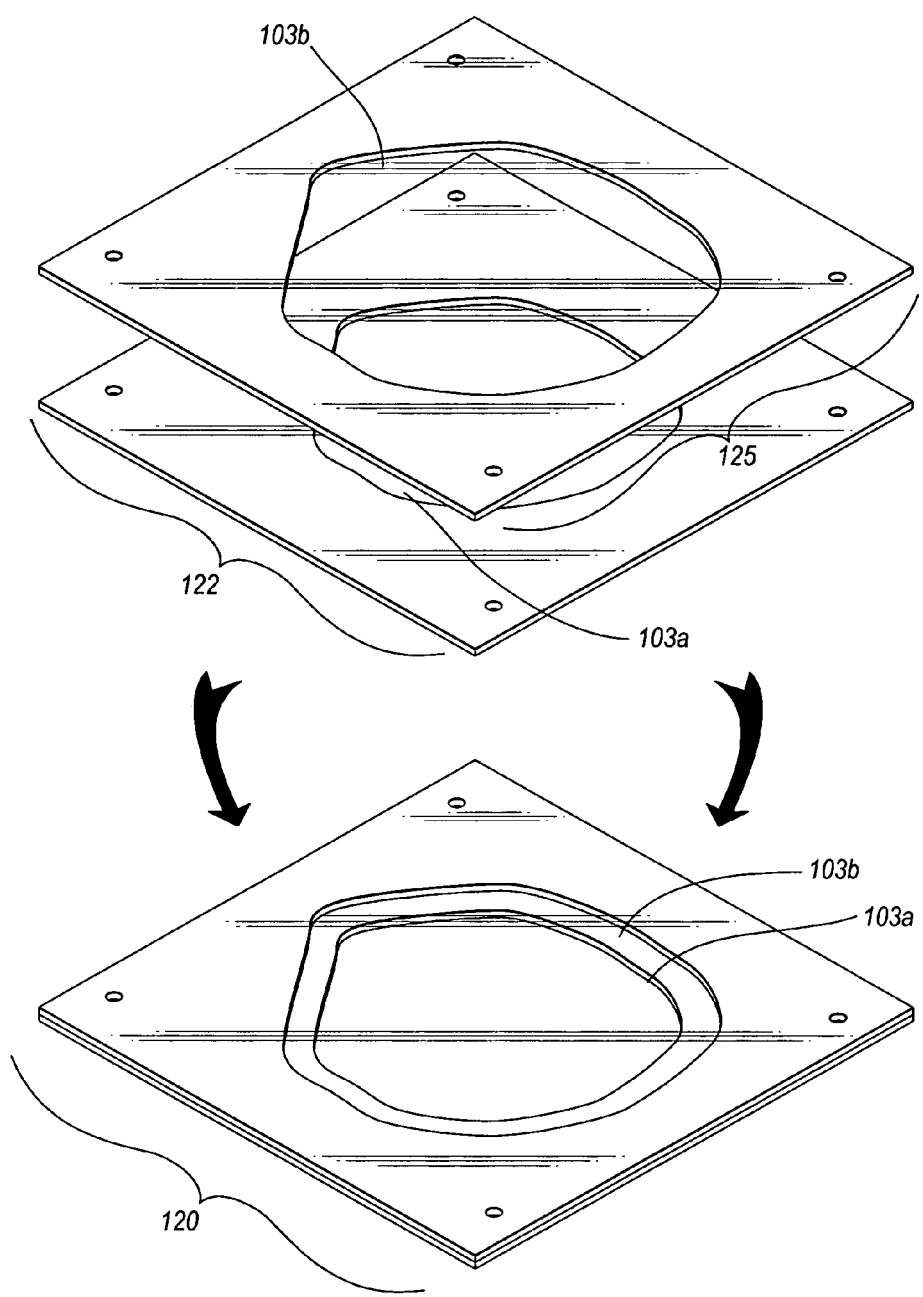
FIG. 2 illustrates a conceptual diagram for combining two or more two-dimensional images to create a three-dimensional effect in accordance with an implementation of the present invention.

In any case, one or more three-dimensional images can be created by overlapping successive, screened, layers. In particular, FIG. 2 shows a first extruded resin sheet 122 having a certain thickness, and having a "reference pattern", where ink has been screened to form a translucent or transparent shape 103a. FIG. 2 also shows a second extruded resin sheet 125 having a certain thickness, and having a "second pattern", where a translucent or transparent shape 103b has been formed that is a slightly larger version of portion 103a.

A stratified resin product 120, therefore, can be created by overlapping extruded resin sheet 125 over extruded resin sheet 122, and hence overlapping the "second pattern" over the "reference pattern", separated by the thickness of the first or the second extruded sheet. The decorative panel 120 appears to have a three-dimensional effect in part since a portion of each extruded resin sheet 122 and 125 can be identified when peering through the translucent or transparent portions 103a and 103b, and in part due to the stratifying effect of each extruded resin sheet's thickness.

Figure 3A:
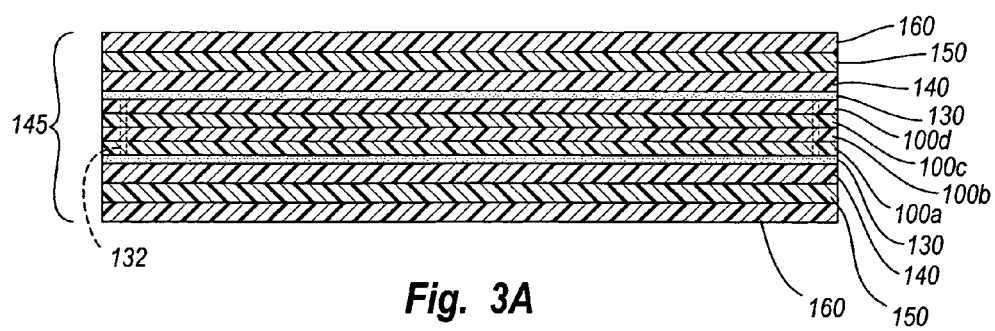
FIG. 3A illustrates a partially exploded, cross-sectional view of a laminate assembly for use in accordance with an implementation of the present invention.
Figure 3B:
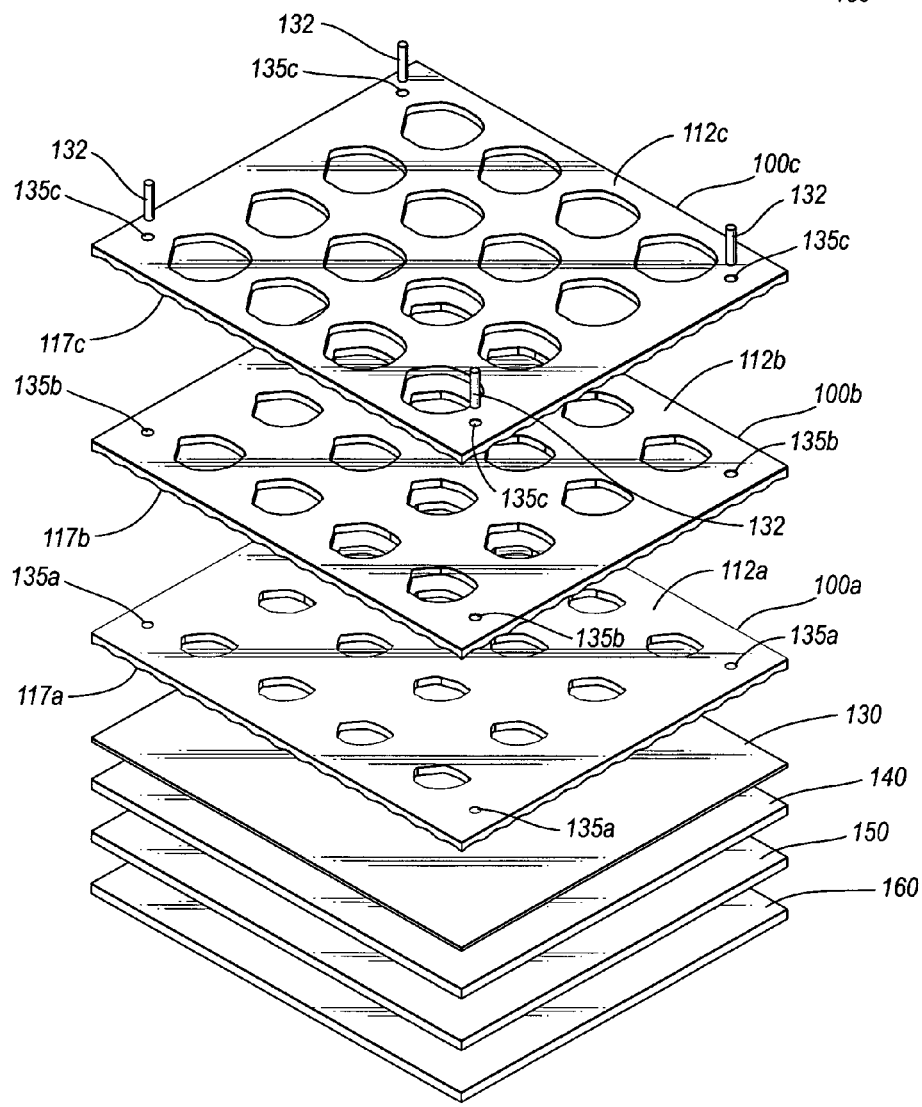
FIG. 3B illustrates an exploded perspective view of a sequence for positioning components of the laminate assembly in FIG. 3A in accordance with an implementation of the present invention.

FIG. 3A provides a more particular description of how multiple layers 100 (e.g., layers 100a-100d) can be assembled together to provide a final product with three-dimensional effects. In particular, FIG. 3A illustrates an overview of a laminate assembly 145 for use in accordance with an exemplary implementation of the present invention. While, FIG. 3B illustrates a sequential overview for positioning layers of the laminate assembly 145 in FIG. 2A, albeit rotated a degree prior to sending the laminate assembly through a thermosetting press. Detailed descriptions of sending a laminate assembly 145 through a thermosetting press to form a final product can be found in U.S. Pat. Nos. 6,025,069, 5,998,028, 5,958,539, 5,894,048, and 5,643,666, each of which is incorporated herein by reference.

FIG. 3A shows that, a laminate assembly 145 has a bottom layer 160 that will be used to guide the extruded resin sheets and embedded objects 235 into a thermosetting press (not shown), such as a stationary press. In at least one implementation, the bottom layer 160 is a metal plate, such as a steel or aluminum plate having a thickness of approximately 2 mm. Because the metal plate 160 is subject to repeated stresses from continual direct contact with the stationary press platens (not shown), metal plate 160 is typically not a perfectly flat surface.

Accordingly, it can also be useful to use a soft, albeit heavy duty, next layer which is generally a pressure pad 150 positioned on top of the metal plate 160. The pressure pad 150 can be useful to help equalize the pressure on, and temperature of, the remaining layers, thereby helping form a highly uniform surface of the decorative resin panel in final form. The pressure pad 150 preferably comprises a compressible fabric prepared from copper, silicone, or NOMEX®, or a combination of the preceding. NOMEX® is an aramid fabric available from DuPon de Nemours, E.I. & Company.

The manufacturer then places a flexible metal plate 140, such as a flexible aluminum plate of approximately 20-140 mm (508 to 3556 microns), on top of the pressure pad 150. Although the metal plate 140 is flexible, the metal plate 140 is preferably a substantially smooth, flat surface. The metal plate 140 can help ensure that the final decorative resin product maintains an even, planar shape.

The manufacturer then places a paper layer 130 (e.g., acrylic paper) against the flexible metal plate 140. Preferably, the paper layer 130 comprises an adhesive surface (e.g., acrylic adhesive, not shown) that is oriented away from the metal plate, or that is positioned against the bottom-most extruded sheet 100a (the reference image layer). This position allows the paper layer 130 to add any finishing or texturing to the adjacent extruded sheet layer, depending on the nature of the paper layer 130. For example, the paper layer 130 can provide any variation on gloss, grain, or other texture finish to the adjacent image layer that is apparent when the end-user peels the paper layer 130 away.

The manufacturer can then position a screened, first layer 100a on top of the paper layer 130. By way of explanation, the terms "first layer", "second layer", "reference pattern", and "second pattern", as used herein, refer primarily to points of sequence of multiple extruded resin sheets in a laminate assembly 145. In particular, at any given selection of two contiguous extruded sheets, one extruded resin sheet can be referred to as the first layer; while the other extruded sheet can be referred to as the second layer. Thus, although frequent reference herein is made to the bottom-most image layer as the reference layer, any image layer in a laminate assembly can be a first or reference layer with respect to the next (or second) layer that is laid on top.

A manufacturer can identify the proper sequence of two or more extruded resin layers in most cases based on the size, shape, and configuration of the pattern on one layer compared with a pattern on another layer. For example, the pattern on the reference, or first, layer (or the "reference pattern") is of a certain size, shape, and configuration that it can be used as a reference for aligning the corresponding pattern on the next, or second, image layer (or the "second pattern"). Thus, at least a portion of the reference pattern will be visible through the second pattern of the next image layer when aligning the next image layer over the reference image layer.

In at least one exemplary implementation of the present invention, the first extruded layer 100a (as well as the second extruded layer 100b) comprises an extruded copolyester sheet of repeating units of terephthalic acid residues (e.g., PETG), ethylene glycol residues, and cyclohexanedimethanol residues. The initial first extruded resin layer 100a, and the subsequent extruded resin layers 100b, 100c, 100d, etc. can also comprise extruded polycarbonate. The term "polycarbonate" refers generally to thermoplastic, aromatic polymers including homopolycarbonates, copolycarbonates, copolyestercarbonates and mixtures thereof having average molecular weights of between approximately 8,000 amu (atomic mass units) and 200,000 amu. Preferably, polycarbonates for use with some implementations the present invention have molecular weights of between approximately 20,000 amu and 80,000 amu, and have an instrinsic viscosity (I.V.) of approximately 0.40 to approximately 1.5 dl/g as measured in methylene chloride at approximately 25° C.

In one implementation, the first and second layers 100a-100d each have a thickness of between approximately 0.1 inches and approximately 0.2 inches, depending on the desired thickness of the final, decorative resin panel 120. For example, a relatively thin decorative resin panel can comprise a composite resin product of three to four image layers 100, each having a thickness of approximately 0.118 inches. While on the other hand, a thicker composite resin product can comprise 5-6 (or more) image layers 100, each having a thickness of approximately 0.177 inches.

Thus, FIG. 3A shows that the laminate assembly 145 is configured to form a four-layer decorative panel product. If the manufacturer intends only to create a four-layer decorative panel, then the preceding layers of paper 130, metal sheet 140, and so forth are added to the opposing side of the first layer 100*d*, prior to sending the assembly 145 through a stationary press. On the other hand, if the manufacturer desires to create a thicker decorative panel product, preceding steps are merely repeated, as desired, to create a larger laminate assembly stack. That is, a thicker decorative panel product will comprise 5-6 (or more), screened, extruded resin layers stacked together, and so on.

One can appreciate, therefore, that a three-dimensional artistic effect in accordance with aspects of the present invention relies at least in part on the vertical and horizontal arrangement of successive image layers (100*a* aligned with 100*b*, 100*c*, etc.), as well as each layer's given thickness. That is, vertical or horizontal misalignment of the successive image layers may negate or minimize the desired three-dimensional effect. As such, implementations of the present invention further provide for ensuring that each of the layers 100 are appropriately positioned in the correct vertical arrangement, and that the successive layers 100 do not slide out of horizontal position during the thermosetting process.

For example, implementations of the present invention include securing means, such as registration pins 132, and corresponding registration points, such as corresponding registration holes 135*a*, 135*b*, 135*c*, etc., which help secure lateral slippage of one layer (e.g., 100*a*) with respect to the next (e.g., 100*b*). One will appreciate, however, that a variety of securing means and registration points can be used to secure one pattern from slipping with respect to another. In particular, each layer can comprise one or more indented gripping points (not shown) that are secured by one or more clamps, such as one or more metallic, depressible clamps (not shown), and so forth. The following description with respect to registration holes and registration pins, therefore, is provided merely for convenience.

Accordingly, FIG. 3B shows that the manufacturer places a first extruded layer 100*a* in the appropriate position in the laminate assembly 145. The manufacturer can then align the second extruded layer 100*b* on top of the first extruded layer 100*a*, such that the registration holes 135*b* in the second extruded layer 100*b* align directly over the registration holes 135*a* in the first extruded layer 100*a*. The manufacturer repeats this for the next extruded layer 100*c*, having surfaces 112*c*, 117*c*, and so on (e.g., extruded layer 100*d*, etc.) depending on the number of extruded resin layers required for the given laminate assembly 145. As such, the manufacturer ensures that the registration holes 135*a*, 135*b*, 135*c*, etc. align.

After alignment, the manufacturer then can insert one or more registration pins 132 through each corresponding registration hole (e.g., 135*c*) of the upper-most extruded layer (e.g., 100*c*). An exemplary registration pin 132 can comprise any number of materials of strength sufficient to prevent at least some lateral slippage of neighboring image layers, although materials consistent with the makeup of the given image layers 100*a*, 100*b*, 100*c*, etc. may be preferable. For example, if the extruded resin layers comprise extruded PETG, an ideal registration pin may also be composed of PETG, nylon, or related copolyesters. This allows the registration pin 132 to expand and contract consistent with the material of the given extruded layer. As well, the registration pin 132 can melt into the laminate assembly 145 as the given extruded layers melt/form during the thermosetting/thermoforming process, such that the registration pin 132 is relatively imperceptible after production.

An exemplary registration hole (e.g., 135*a*, 135*b*, 135*c*, etc.) is also configured such that there is minimal visual impact on the final, decorative panel product. In one implementation, for example, the registration holes 135*a*, 135*b*, etc. and pins 132 are positioned on portions of the relevant extruded layer (e.g., 100*a*, 100*b*) that are outside of the width or length of a standard decorative resin panel. The portions of each respective layer containing the registration holes and registration pins are then removed after the thermosetting process. As such, important alignment considerations can be made when creating the decorative resin panel without reducing important width and length dimensions of the standard decorative resin panel.

Referring again to FIG. 3B, the manufacturer inserts registration pin 132 from an upper registration hole (e.g., 135*c*) through the lower-most registration hole (e.g., 135*a*) of the bottom-most extruded layer (e.g., 100*a*), thereby securing each extruded layer from the top, middle, and bottom extruded resin layers from lateral shifting. Thus, the registration pin 132 is typically at least of sufficient length that the top of the registration pin is flush (or just beneath) with the upper surface (e.g., 112*c*) of the upper-most extruded layer (e.g. 100*c*) after it is inserted through the bottom-most registration hole (e.g., 135*a*). In another implementation, the registration pin 132 extends above the upper surface (e.g., 112*c*) of the upper-most extruded layer (e.g., 100*c*), but is clipped to be flush with the upper surface (e.g., 112*c*).

FIG. 3B also shows that at least some of the extruded resin layers (100*a*-100*c*) may comprise special texturing on at least one surface (117*a*-177*c*) of an extruded layer prior to being positioned in the laminate assembly 145. Typically, the textured surface (e.g., 117*b*) of a subsequent, or second, layer (e.g., 100*b*) will be aligned against an image surface (e.g., 112*a*) of a contiguous, reference, or first, image layer (e.g., 100*a*). Texturing at least one surface, as shown, can be done by a manufacturer at any stage in the process of making a laminate assembly 145, or in the process of making the extruded resin sheet that is used as a first layer 100. The texturing can be pronounced and consistent, as well as subtle and inconsistent, so long as the texturing causes at least imperfect contact between contiguous image layers (e.g., 100*a* and 100*b*).

Generally, texturing a non-image surface (e.g., 117*a*, 177*b*, 177*c*, etc.) of an extruded layer (e.g., 100*a*, 100*b*, etc.) can help air bubbles escape between two contiguous extruded layers (e.g., 100*a*, 100*c*). This is due at least in part when texturing on one surface (e.g., 117*b*) of one image layer (e.g. 100*b*) is not matched by the contiguous surface (112*a*) of the contiguous image layer (100*a*). Initially, texturing may appear to cause at least some opacity in otherwise transparent portions of an extruded resin layer. Nevertheless, texturing can be easily removed as the textured portions oz smooth out (i.e., melt) during an exemplary thermosetting process. Furthermore, as the texturing smoothes out from the inside toward the periphery between two image layers (e.g., 100*a* and 100*b*), air escapes readily in the same direction. Other ways in accordance with the present invention of relieving air bubbles include use of a liquid adhesive between the two (or more) extruded layers.

Figures 4, 5:
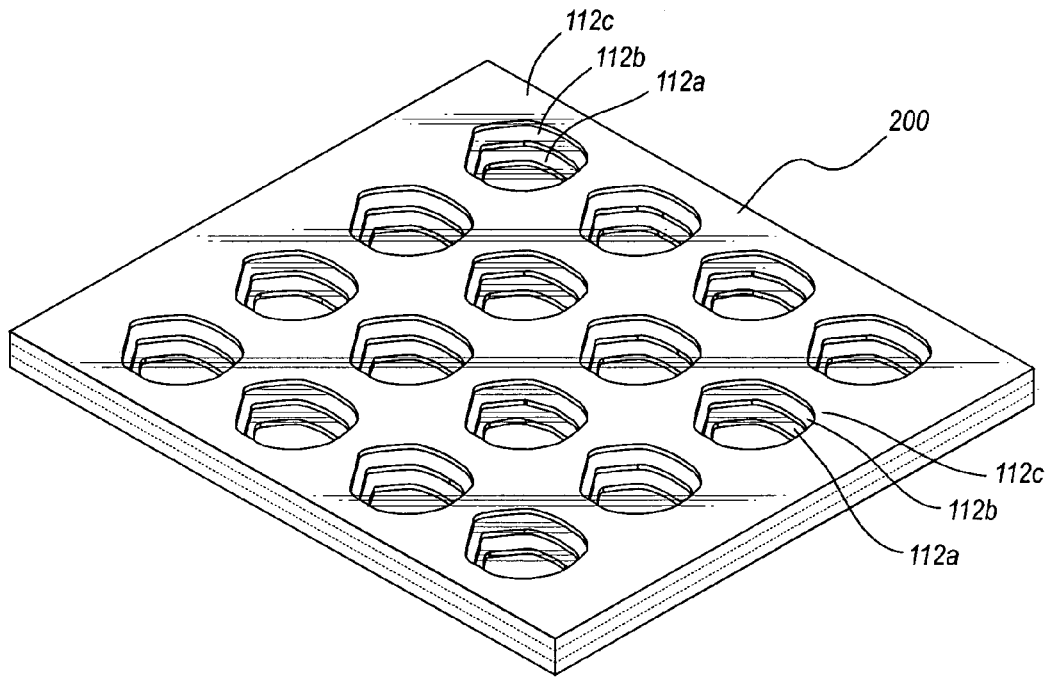
FIG. 4 illustrates a chart of processing steps and corresponding pressure and temperature ranges for implementing a process for forming a decorative resin panel product in accordance with an exemplary implementation of the present invention.
FIG. 5 illustrates an exemplary resin product that can be manufactured after implementing the process steps described in FIGS. 3A, 3B, and 4.

FIG. 4 illustrates a chart of primary processing steps and corresponding pressure and temperature ranges for implementing a process for forming a decorative resin panel. The pressures and temperatures illustrated in FIG. 4 are specific to extruded PETG sheets, and extruded copolyester sheets having similar properties. One reason PETG and related materials are particularly useful is that PETG has a lower melting point than polycarbonate, which can be helpful in some implementations of the present invention. Furthermore, PETG panels are resilient, resistant to cracking and other stresses that would damage other materials. By contrast, while polycarbonate is also a similarly strong material, extruded polycarbonate has a higher melting point than extruded PETG. As such, the processes in accordance with the present invention can be applied to a broad range of extruded materials.

By way of explanation and not of limitation, PETG and related copolyesters include a polyethylene terephthalate polyester modified with 2 mole % to 99 mole % of cyclohexanedimethanol repeat unit. The cyclohexanedimethanol may be either the 1,4- or 1,3-isomer and may be either in the cis- or trans-form or a mixture of the isomers. The copolyester may be semi-crystalline or amorphous, preferably amorphous.

The copolyester contains repeat units from a dicarboxylic acid and a diol, based on 100 mole % dicarboxylic acid and 100 mole % diol. The dicarboxylic acid component contains at least 80 mole % of terephthalic acid or dimethylterephthalate. The copolyester may optionally be modified with up to 20 mole % of one or more different dicarboxylic acids other than terephthalic acid or dimethylterephthalate such that the total dicarboxylic acid content is equal to 100 mole %. Examples of other dicarboxylic acids which may be used with terephthalic acid include phthalic acid, isophthalic acid, 1,4-, 1,5-, 2,6-, and 2,7-naphthalenedicarboxylic acid, 1,3-, 1,4-cyclohexanedicarboxylic acid, cyclohexanediacetic acid, oxydibenzoic acid, 4,4-biphenyldicarboxylic acid, succinic acid, glutaric acid, adipic acid, azelaic acid, sebacic acid, suberic acid, pimelic acid, and 1,12-dodecanedioic acid. The copolyester may be prepared from one or more of the above dicarboxylic acids.

It should be understood that use of the corresponding acid anhydrides, esters, and acid chlorides of these acids is included in the term "dicarboxylic acid".

The diol component contains repeat units from 98 to 1 mole % ethylene glycol and 2 to 99 mole % 1,4-cyclohexanedimethanol and/or 1,3-cyclohexanedimethanol. The cyclohexanedimethanol may be present as the cis or trans isomer or mixtures thereof. In addition, the diol component can optionally be modified with up to 20 mole % of one or more different diols other than ethylene glycol and cyclohexanedimethanol such that the total diol content is equal to 100 mole %. The additional diols include cycloaliphatic diols having 6 to 16 carbon atoms and aliphatic diols having 3 to 16 carbon atoms.

Examples of diols which may be used with ethylene glycol and cyclohexanedimethanol include diethylene glycol, triethylene glycol, propane-1,3-diol, butane-1,4-diol, pentane-1,5-diol, hexane-1,6-diol, 3-methylpentanediol-(2,4), 2-methyl-pentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The copolyester may be prepared from one or more of the above diols. The copolyesters may also be modified with polyethylene glycols or polytetramethylene glycols to enhance elastomeric behavior.

As used herein, the related copolyester also has an inherent viscosity of 0.5 to 1.2 dL/g. Preferably, the copolyester has an inherent viscosity of 0.6 to 0.9 dL/g as measured at 25° F. using 0.50 grams of polymer per 100 ml of a solvent consisting of 60% by weight phenol and 40% by weight tetrachloroethane. It is especially preferred that the copolyester be prepared from or derived from repeating units consisting of terephthalic acid units, ethylene glycol units and 1,4-cyclohexanedimethanol units.

Continuing with FIG. 4, once a manufacturer has properly positioned the extruded resin layers within a laminate assembly 145, the manufacturer can subject the laminate assembly 145 to a variety of temperatures and pressures, as part of a thermosetting process. In particular, at least one implementation of a process for setting a decorative laminate assembly includes a step 210 of raising the temperature from a standard temperature of approximately 70° F. to between approximately 230° F. to 240° F. While the manufacturer is raising the temperature, the manufacturer also can raise the pressure from approximately standard atmospheric pressure to between approximately 90 psi (pounds per square inch) to 96 psi.

Raising the temperature and pressure in this manner can be performed using a variety of conventional thermosetting machines over a variety of lengths of time. In one implementation, for example, the temperature and pressure can be raised as indicated with between approximately 20 minutes and approximately 40 minutes. Of course, the manufacturer can speed or slow the amount of time needed to reach the upper temperature depending on the thermosetting machine, the type of materials used, the type of ink used in the screening process, and the type of patterns used on a given first layer 100.

As the temperature and pressure rise to the upper end, the individual layers of the laminate assembly 145 begin to soften and melt together. Furthermore, as also previously described, air bubbles evacuate toward the peripheral edges of the laminate assembly 145. Once the temperature and pressure has reached the upper end, the manufacturer can perform a step 220 of lowering the temperature to a cooling point. In particular, the manufacturer cools the thermosetting press from the upper temperature to between approximately 120° F. and 70° F., while holding the pressure constant. Finally, after the press is sufficiently cooled, the manufacturer can perform a step 230 of removing the final product from the thermosetting press, thereby subjecting the final product to standard, or atmospheric, temperature and pressure.

FIG. 5 illustrates an exemplary resin product 200 that can be manufactured after implementing the process steps described in FIGS. 3A, 3B, and 4. As shown, the final decorative resin panel 200 can comprise a variety of three-dimensional representations based on overlapping, stratified transparent or translucent portions 103a, 103b, and 103c, etc.

One will appreciate, after reading the present specification and claims, that the foregoing steps and materials can be varied to create a wide variety of designs having three-dimensional effects. For example, colored extruded sheets (not shown) can be used that vary to different degrees of opacity or translucence. In addition, any number of designs 105, other than those illustrated in the present specification, can be used equally within the context of the present inventive concepts. Still further, a manufacturer may forego the screening process 102 and adhere one or more individual artistic designs 105 on each given extruded sheet 110 individually. That is, screening is simply one efficient means for placing one design on several extruded sheets without having to recreate a given artistic image multiple times.

Figures 6, 7:
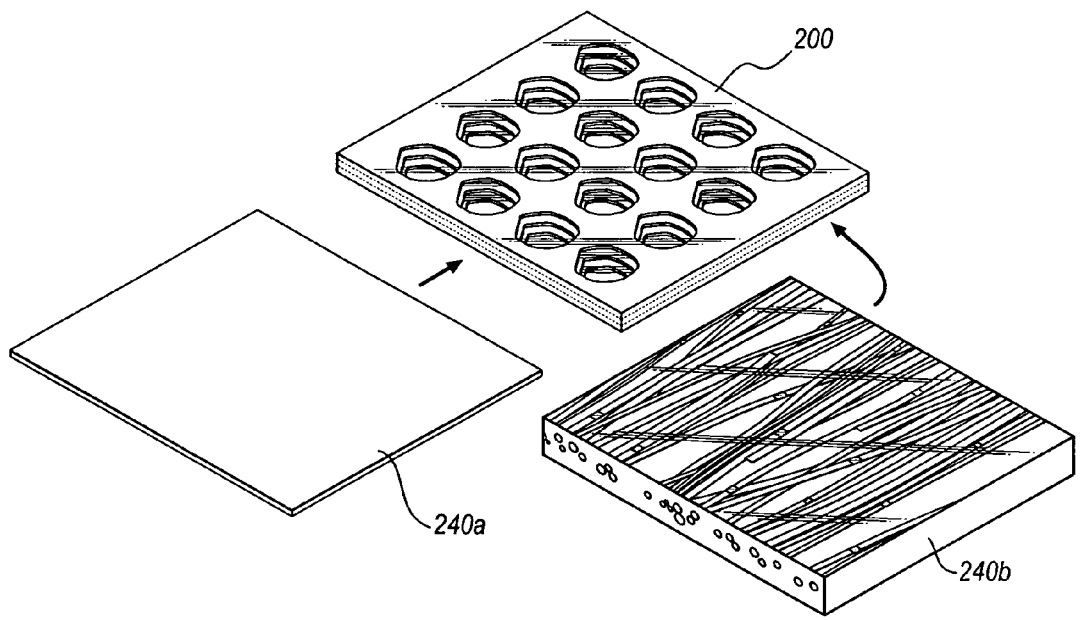
FIG. 6 illustrates a conceptual overview for combining an additional image layer to a decorative resin product in accordance with an implementation of the present invention.
FIG. 7 illustrates a second chart of processing steps and corresponding pressure and temperature ranges for implementing a process for combining an additional image layer to a decorative resin product.

The manufacturer can also manipulate the look and feel of the final product 200 by, alternatively, adding additional image layers in additional thermosetting processes. For example, FIG. 6 illustrates a conceptual overview for combining an additional image layer to a decorative resin product in accordance with an implementation of the present invention. In particular, a manufacturer can add color or other visible effect with an additional colored, image layer 240a, or an additional embedded-object image layer 240b, or any other type of additional image layer. As such, there are a wide variety of image layers that can afterward be combined with the decorative panel 200 to create a wider variety of effects.

Generally, these image layers will need to be assembled and set in a separate thermosetting process prior to adding them to a final decorative panel 200. One process for making an image layer comprising embedded natural objects (e.g., image layer 240b) such as thatch, coffee beans, and so forth is described in commonly-assigned U.S. patent application Ser. No. 10/821,307, filed on Apr. 9, 2004, entitled "ARCHITECTURAL LAMINTE PANEL WITH EMBEDDED COMPRESSIBLE OBJECTS AND METHODS FOR MAKING THE SAME", the entire contents of which are incorporated herein by reference. Accordingly, the additional image layers 240a, 240b, etc. may comprise materials (extruded sheet, as well as image materials, inks, etc.) that are different from what are included in the decorative panel product 200. Thus, a manufacturer may need to implement different temperatures and pressures in a second thermosetting process.

Accordingly, FIG. 7 illustrates a second chart of processing steps and corresponding pressure and temperature ranges for implementing a process for combining an additional image layer with a decorative resin product. In particular, a manufacturer first assembles a decorative panel 200 with a desired second image layer, such as second image layer 240a, 240b, etc. The manufacturer can assemble the decorative panel 200 and the second image layer 240a, 240b, etc. in a second laminate assembly (not shown) as described in FIGS. 3A and 3B, so that the second laminate assembly includes a metal plate 160, a pressure pad 150, and so forth with appropriate image layers inserted in between. The manufacturer can then place the second laminate assembly into a thermosetting press and subject the second laminate assembly to appropriate temperatures and pressures.

In one implementation, the manufacturer performs a step 310 of raising the temperature of the second laminate assembly from approximately 70° F. (approximate atmospheric temperature) to between approximately 230° F. and approximately 240° F. The manufacturer also raises the pressure, albeit at a different level than as described by the process depicted in FIG. 4. That is, the manufacturer raises the upper temperature and pressure to a degree that the decorative panel product 200 and the additional image layer 240a, 240b, etc., begin to melt together without ruining the respective image layers. For example, the different materials in the additional image layer 240a, 240b, etc. may necessitate that the manufacturer raise the pressure more slowly, or raise the temperature only to a smaller initial pressure. As shown in step 310, the manufacturer raises the pressure of the second laminate assembly to between approximately 15 psi to approximately 40 psi.

If the manufacturer knows in advance that the decorative panel 200 will be combined with an additional image layer 240a, 240b, etc., the manufacturer may need to add a certain degree of texture to the bottom of first layer 100a when creating the initial product 200. This can be done by the manufacturer in the initial thermosetting process (e.g., FIG. 4) by using an appropriately-textured adhesive paper layer 130 with the first extruded layer 100a. Thus, when the manufacturer combines the final product 200 with a second image layer 240a, 240b, etc. there is sufficient texture between the final product 200 and the second image layer 240a, 240b, etc. to ensure air bubbles are not trapped.

Continuing with FIG. 6, after the upper end of the appropriate temperature and pressure (e.g., step 310) have been reached, the manufacturer can perform a step 320 of cooling the combined materials to between approximately 120° F. and approximately 70° F., causing the combined materials to solidify into proper form. Once the combined materials have solidified appropriately, the manufacturer can perform a step 330 of removing the combined materials from the thermosetting press, subjecting the combined materials to atmospheric temperature and pressure.

Figure 8A:
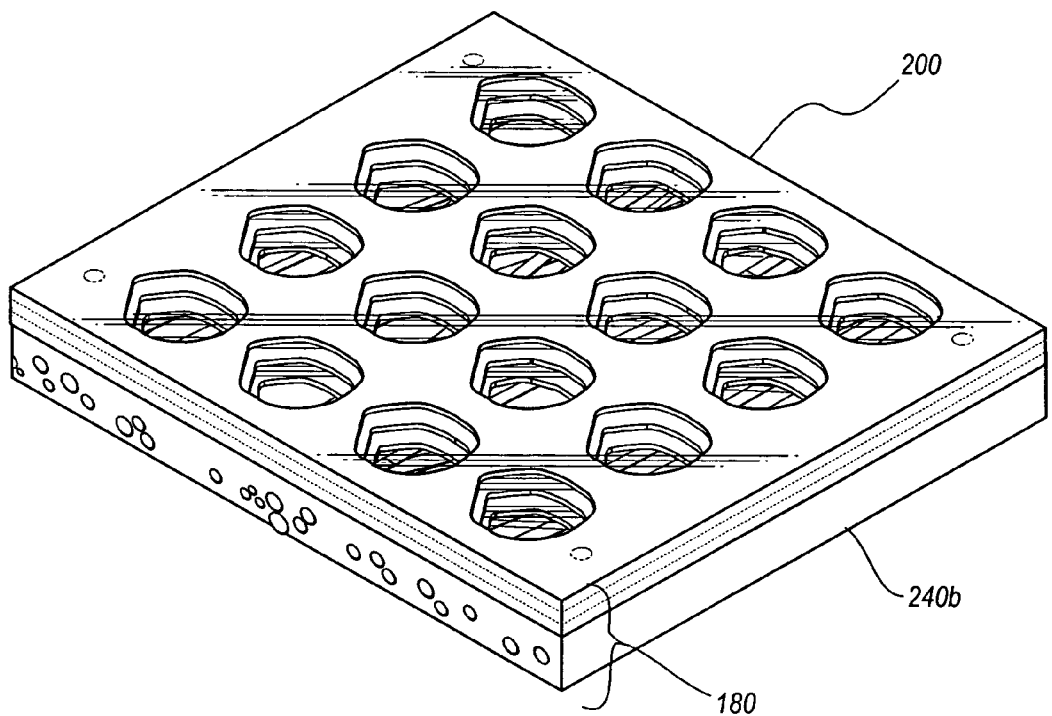
FIG. 8A illustrates an exemplary resin product that can be manufactured after implementing the process steps described in FIGS. 6 and 7.
Figure 8B:
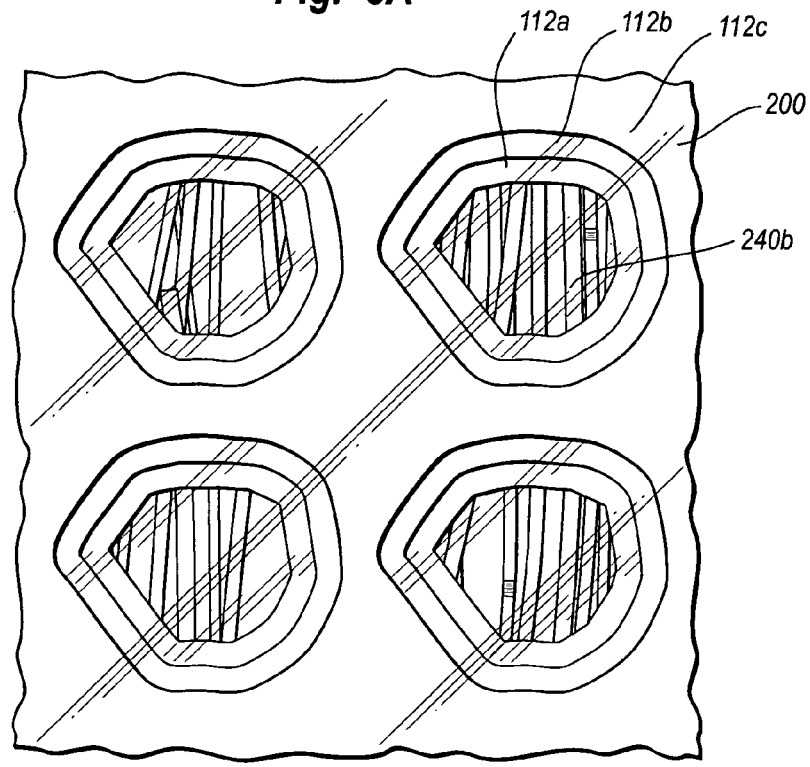
FIG. 8B illustrates a plan view of a portion of the exemplary resin product depicted in FIG. 8A.

FIG. 8A illustrates an exemplary final product 180 that can be manufactured after implementing the process steps described in FIGS. 6 and 7. In particular, FIG. 8A shows that a final product 180 using image layer 240b comprises combined materials including decorative panel 200 and the second image layer 240b. In particular, the final combined product 180 shows portions of the image layer 240b through at least the transparent portions 103a, 103b, 103c of product 200. FIG. 8B shows a plan view of a portion of FIG. 8A, further showing the stratified layers, and the second image layer 240b.

Implementations of the present invention therefore allow a manufacturer to create artistic designs in resin products using multiple extruded sheets, and multiple corresponding artistic designs. The corresponding processes, materials, and designs can be varied to a wide degree, allowing a manufacturer to create wide range of artistic, architectural panels using multiple extruded resin layers. Furthermore, visually-appealing, three-dimensional effects can be created using the techniques and materials described herein with a high degree of manufacturing and cost-efficiency.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A decorative resin panel for use in architectural design comprising:
   a first resin layer having a first thickness and a translucent reference image pattern surrounded by a printed portion on at least one surface of the first resin layer; and
   a second resin layer having a second thickness, and a translucent second image pattern surrounded by a second printed portion on at least one surface of the second resin layer, the second image pattern having a shape similar to the reference image pattern but a different size than the reference image pattern;
   wherein:
   the second resin layer is placed upon the first resin layer such that the first resin layer and the second resin layer are separated by at least the thickness of the first resin layer or the second resin layer; and
   the second image pattern is horizontally and vertically aligned with, and directly overlaps the reference image pattern, thereby creating a three-dimensional effect;
   one or more securing means melted within and to each of the first resin layer and the second resin layer and flush with the at least one surface of the second resin layer.

2. The decorative resin panel as recited in claim 1, wherein the second resin layer comprises a textured surface that is opposite to a surface comprising the second image pattern, such that the textured surface is positioned against a surface of the first resin layer comprising the reference image layer.

3. The decorative resin panel as recited in claim 1, further comprising one or more corresponding registration holes positioned within the first resin layer and the second resin layer, within which the one or more securing means are inserted to align the translucent image pattern and the second translucent image pattern and secure the first resin layer with respect to the second resin layer.

4. The decorative resin panel as recited in claim 1, wherein the decorative resin panel comprises one of 4, 5, and 6 successive layers, each of the successive image layers comprising a corresponding pattern, such that overlapping translucent and opaque portions in the corresponding pattern of each of the successive image layers creates a three-dimensional effect.

5. The decorative resin panel as recited in claim 1, wherein the second image pattern is larger than the reference image pattern.

6. The decorative resin panel as recited in claim 5, wherein the reference image pattern comprises a plurality of reference translucent portions within a reference opaque portion; and wherein the second image pattern comprises a plurality of second translucent portions within a second opaque portion.

7. The decorative resin panel as recited in claim 5, wherein the reference image pattern and the second image pattern are transparent.

8. The decorative resin panel as recited in claim 1, wherein any of the first resin layer and the second resin layer comprises an extruded resin sheet having a corresponding pattern formed thereon.

9. The decorative resin panel as recited in claim 8, wherein the extruded resin sheet comprises one of extruded PETG, polycarbonate, and PMMA.

10. The decorative resin panel as recited in claim 8, wherein the extruded resin sheet has a width and length dimension of approximately 3'×5', approximately 4'×8', or approximately 6'×10'.

11. The decorative resin panel as recited in claim 8, wherein the reference image pattern and the second image pattern have been formed on the corresponding extruded resin sheet using at least one of a silk screening and a digital screening process.

12. The decorative resin panel as recited in claim 11, wherein the reference image pattern and the second image pattern comprise a polyester ink formed about one or more translucent portions.

13. The decorative resin panel as recited in claim 1, further comprising an additional image layer that has been formed with the decorative resin panel after the decorative resin panel has been made.

14. The decorative resin panel as recited in claim 13, wherein the additional image layer comprises two or more extruded sheets formed about an embedded two-dimensional material, wherein the embedded two-dimensional material is at least one of colored and textured.

15. The decorative resin panel as recited in claim 13, wherein the additional image layer comprises two or more extruded sheets formed about an embedded three-dimensional material, wherein the embedded three-dimensional material comprises at least one of thatch, willow reed, bamboo, beans, straw, a tree branch, a tree twig, a bush branch, and a bush twig.

16. A process of creating three-dimensional effects in a decorative laminate panel comprising the acts of:
arranging a first resin layer comprising a reference pattern and a first thickness in a first position of a laminate assembly;
arranging a second resin layer comprising a second pattern and a second thickness on top of the first resin layer of the laminate assembly using one or more securing means such that the second pattern and the reference pattern overlap, separated at least by the thickness of the first resin layer or the second resin layer;
softening the laminate assembly at a first pressure and temperature such that first resin layer, the second resin layer, and the one or more securing means each melt within and to each of the first and second resin layer and flush with the at least one surface of the second layer and form together; and
cooling the laminate assembly to a second temperature.

17. The process as recited in claim 16, wherein the reference pattern and the second pattern have been formed on a corresponding extruded resin sheet using at least one of a silk screening and a digital screening process.

18. The process as recited in claim 16, wherein the first pressure is between approximately 90 psi and 96 psi, and wherein the first temperature is between approximately 220° F. and 240° F.

19. The process as recited in claim 16, wherein the second temperature is between approximately 120° F. and 70° F.

20. The process as recited in claim 16, further comprising the acts of:
aligning one or more registration holes in the first resin layer and the second resin layer; and
inserting a registration pin into the aligned one or more registration holes, such that the first resin layer and the second resin layer are secured in at least one position.

21. The process as recited in claim 16, further comprising the act of texturing at least one surface of one or more of the first resin layer and the second resin layer.

22. The process as recited in claim 16, wherein, after the act of cooling the laminate assembly, the method further comprises an act of arranging the decorative resin panel over an additional image layer, wherein the decorative resin panel and the additional image layer form at least a portion of a second laminate assembly.

23. The process as recited in claim 22, further comprising an act of softening the second laminate assembly at a third pressure and temperature, such that the decorative resin panel forms together with the second image layer.

24. The process as recited in claim 23, wherein the additional image layer comprises two or more extruded resin sheets formed about at least one of a two-dimensional material, and a three-dimensional object.

25. The process as recited in claim 23, wherein the third pressure is between approximately 15 psi and 40 psi, and wherein the third temperature is between approximately 220° F. to 240° F.

26. The process as recited in claim 23, further comprising an act of pressing the second laminate assembly at a fourth pressure.

27. The process as recited in claim 26, wherein the fourth pressure is between approximately 90 psi and 96 psi.

28. A laminate sheet assembly for use in a thermosetting process comprising:
a first extruded resin sheet having a reference pattern formed thereon, and one or more registration holes;
a second extruded resin sheet having a second pattern formed thereon, and one or more registration holes, wherein the second extruded resin sheet is aligned with the first extruded resin sheet based at least on the one or more registration holes in the first extruded resin sheet and the second extruded resin sheet; and one or more corresponding securing means placed about the one or more registration holes such that a first end of each of the one or more securing means is flush with an upper surface of the second extruded resin sheet;

wherein the one or more securing means are each configured to melt and form together in a corresponding registration hole of the first and second extruded resin sheets, such that the reference pattern of the first extruded resin sheet is secured with respect to the second pattern of the second extruded resin sheet.

29. The laminate sheet assembly as recited in claim 28, further comprising an image layer comprising two or more extruded sheets formed about an embedded two-dimensional material, wherein the embedded two-dimensional material is at least one of colored and textured.

30. The laminate sheet assembly as recited in claim 28, wherein the first and second extruded resin sheets comprise extruded PETG sheets.

31. The decorative laminate panel as recited in claim 28, wherein the first and second extruded resin sheets comprise extruded polycarbonate sheets.

32. The laminate sheet assembly as recited in claim 28, wherein the first and second extruded resin sheets are further aligned based on alignment of the reference pattern with the second pattern.

* * * * *

UNITED STATES PATENT AND TRADEMARK OFFICE
CERTIFICATE OF CORRECTION

PATENT NO.       : 7,615,276 B1                                        Page 1 of 1
APPLICATION NO.  : 11/202784
DATED            : November 10, 2009
INVENTOR(S)      : R. Talley Goodson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Nineteenth Day of October, 2010

David J. Kappos
*Director of the United States Patent and Trademark Office*